Feb. 18, 1964

R. J. HAMMOND 3,121,567

PHONOGRAPH TONE ARM

Filed May 18, 1962

Inventor:
Robert J. Hammond.
By Brown Jackson Boettcher & Dienner
Att'ys

United States Patent Office
3,121,567
Patented Feb. 18, 1964

3,121,567

PHONOGRAPH TONE ARM

Robert J. Hammond, Stevensville, Mich., assignor to V-M Corporation, Benton Harbor, Mich., a corporation of Michigan Filed May 18, 1962, Ser. No. 195,856
4 Claims. (Cl. 274—25)

The present invention relates to a phonograph tone arm embodying improved cartridge mounting structure for mounting a cartridge in a vertically compliant manner.

Phonograph records are generally warped to some extent, resulting in the transmission of shocks from the record to the needle and cartridge assembly mounted in the tone arm, thus causing a variation in needle pressure and consequent inaccurate tracking of the needle in a record groove. Conventional tone arms are not well suited to follow rapid movements of a phonograph record due to the large mass of such arms. The difficulty in obtaining accurate tracking of a record groove is further exaggerated where unusually light needle pressures are employed, for example, on the order of about three grams, although it has otherwise been found desirable to provide reduced needle pressures.

Numerous attempts have heretofore been made to alleviate the foregoing problem by providing a vertically compliant cartridge, that is, one which is adapted to move vertically relative to the tone arm. In such instances, the small mass of the cartridge is better able to follow and track a warped record than is the tone arm, and in such a structure it is permitted to do so independently of the tone arm.

Where a cartridge or pickup assembly is adapted to move up and down in accordance with changes in the level of a record being reproduced, without transmitting such movement directly to the tone arm, it is possible to obtain more constant needle pressure and more accurate tracking of the needle in a record groove, while permitting the use of unusually light needle pressure.

Another advantage of a vertically compliant cartridge is that the stylus or needle will retract upwardly into the tone arm if a downward force is accidentally applied to the arm, thus protecting the stylus and a record being reproduced thereby from being damaged.

An object of the present invention is to provide a tone arm embodying means for mounting a cartridge in a vertically compliant manner wherein the mounting means is unusually inexpensive and simple to manufacture and assemble.

Another important object of the invention is to provide a tone arm as last above-mentioned comprising improved means for adjusting the vertical position of the cartridge so as to control the range of vertical travel of the cartridge during reproduction of a record.

Other objects, uses and advantages of the invention will become apparent, or be obvious, from the following specification, particularly when considered in connection with the drawings in which.

Figure 1:
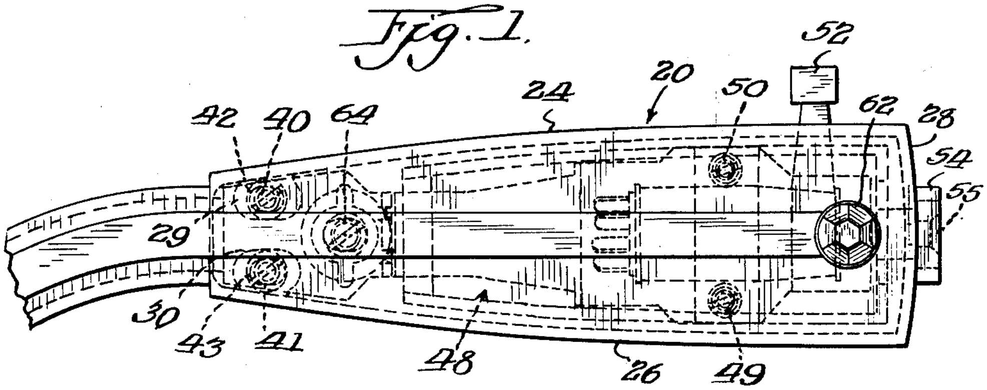
FIGURE 1 is a fragmentary plan view of the head portion of a phonograph tone arm embodying cartridge mounting means in accordance with the present invention.

Referring now to the drawings, there is shown the head portion 20 of a tone arm housing comprising a top wall indicated generally at 22, side walls 24 and 26, and an outer end wall 28. The tone arm housing includes a pair of integral mounting bosses 29 and 30 which project downwardly from the underside of the top wall 22 and extend substantially to the bottom edge of the side walls 24 and 26. The bosses 29 and 30 serve to mount in cantilever fashion a cartridge spring bracket 32 comprising a generally horizonal flat rear portion 34, a generally vertical offset portion 36, and a generally horizontal flat portion 38 which extends forwardly within the tone arm housing and terminates adjacent the outer end wall 28.

The rear portion 34 of the spring bracket 32 is attached to the tone arm housing by a pair of screws 40 and 41 which extend through the portion 34 and into tapped holes provided therefor in the bosses 29 and 30 so as to secure the flat portion 34 against the underside of the bosses. A pair of longitudinal slots 42 and 43 are provided in the bracket portion 34 to accommodate the screws 40 and 41, whereby the longitudinal and lateral positions of the bracket relative to the tone arm housing may be adjusted within the limits determined by the length of the slots.

A cartridge assembly 45, comprising a cartridge 46, a retainer clip 47, and a relatively heavy mounting bracket 48, is secured to the underside of the forward portion 38 of the spring bracket 32 by means of a pair of screws 49 and 50. The cartridge assembly also includes the usual stylus 51 and a conventional lever arm 52 which permit changing from one stylus to another where multiple styli are provided.

A bumper 54 is secured to the outer surface of the end wall 28 by means of a screw 55. The bumper is made of relatively soft plastic material and is generally L-shaped so as to include a lower horizontal arm 56 which extends rearwardly under the wall 28 so as to underlie the end 48′ of the bracket 48. The bumper 54 thus serves to limit the downward movement of the cartridge assembly 45 relative to the tone arm 20, and also serves as a rubbing block for engagement with a record in the event the tone arm should be depressed downwardly against the record so as to cause retraction of the cartridge assembly.

A rod 58 is threaded into the top of the bracket end 48′ so as to extend upwardly therefrom through an aperture 59 provided in the tone arm top wall 22, and a head 60 formed at the upper end of the rod 58 carries an ornament such as the simulated jewel 62. The vertical movement of the jewel 62 relative to the tone arm housing will of course indicate the extent to which the cartridge assembly is moving vertically relative to the tone arm during reproduction of a record.

The spring bracket 32 is preferably made from a thin sheet or strip of metal such as stainless steel. The bracket 32 is supported immediately rearwardly or to the left of the offset portion 36 by an adjusting screw 64 which extends through a slot 65 in the portion 34 of the bracket and into threaded engagement in a tapped hole provided in a boss 66 which is integral with the underside of the tone arm wall 22 and projects downwardly therefrom. It is important to note that the lower end of the boss 66 is disposed upwardly from the lower ends of the bosses 29 and 30 so as to provide sufficient clearance to permit adjustment of the vertical position of the cartridge assembly 45 by threading the screw 64 upwardly or downwardly relative to the boss 66, as desired.

In operation, the tone arm 20 is balanced about its own horizontal pivot axis (not shown) to provide a desired predetermined needle pressure at the stylus 51. When the tone arm is set down on a record the cartridge assembly 45 remains free to move vertically relative to the tone arm, since the spring bracket 32 being made of a thin sheet of metal will readily bend at the lower end 68 of the offset portion 36 adjacent a rubber washer or the like 70 which is disposed between the head of the screw 64 and the horizontal portion 34 of the spring bracket. The extent of such bending for a given load at the stylus will of course be determined by the material employed for the spring bracket 32, and by the width and thickness of the bracket at the section 68 where substantially all of the bending will occur.

The relatively heavy bracket member 48 is preferably made of lead so as to increase the effective weight of the cartridge assembly, and thereby in effect increase the vertical and lateral compliance of the spring bracket 32. The spring bracket is designed to provide a limited amount of lateral as well as vertical compliance, although the lateral compliance is considerably less than the vertical compliance. By providing a cartridge which is somewhat compliant laterally, and by increasing the weight thereof by means of the lead bracket 48, it has been found possible to increase the low frequency or bass response of the cartridge without making the spring portion 68 unduly flexible or fragile.

The spring bracket 32 is bent during manufacture in such a manner that when assembled as shown the rear portion 34 will be biased downwardly against the washer 70. Thus, if the adjusting screw 64 is threaded downwardly, the entire forward end of the spring bracket 32 will move downwardly to lower the position of the cartridge assembly 45. Similarly, if the screw 64 is threaded upwardly into the boss 66, the forward end of bracket portion 34 will be moved closer to the bottom of the boss 66 so as to raise the forward end of the bracket 32 and thus elevate the cartridge assembly relative to the tone arm. Sufficient clearance is provided between the normal position of the bracket portion 34 and the underside of the boss 66 to permit the desired range of adjustment.

Figure 2:
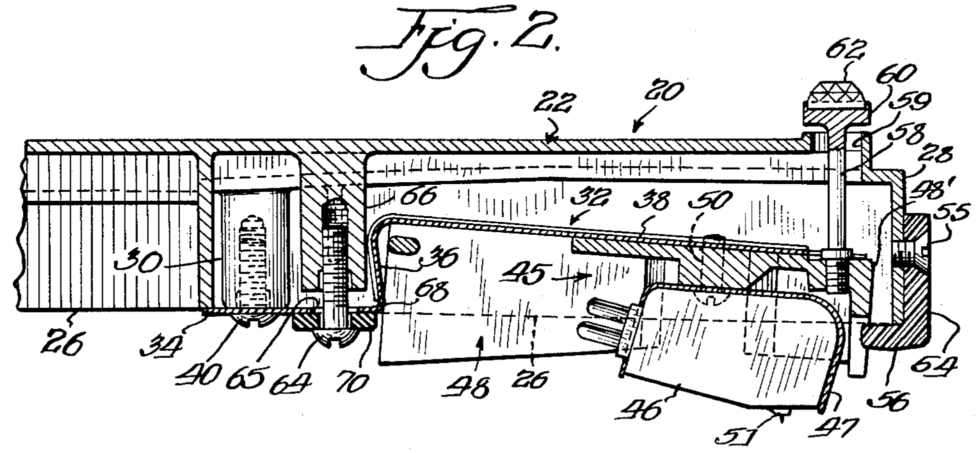
FIGURE 2 is a vertical section of the tone arm assembly of FIGURE 1 showing the vertically compliant cartridge approximately in its lowermost position relative to the tone arm.
Figure 3:
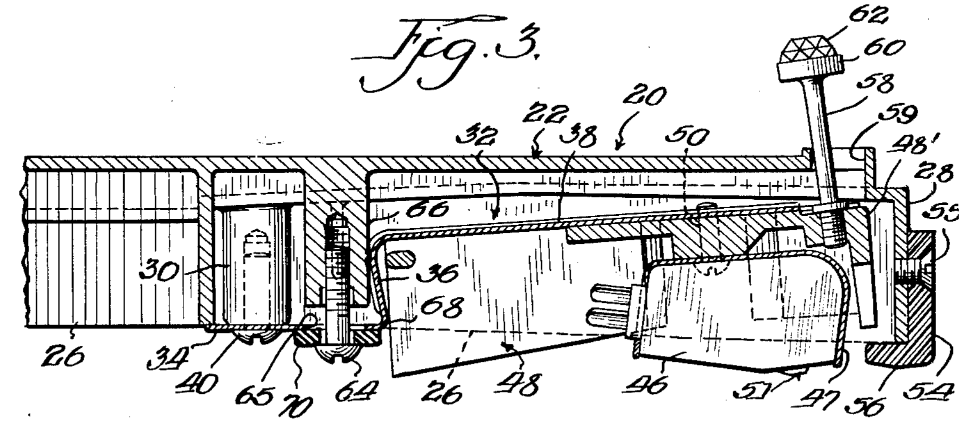
FIGURE 3 is a view similar to FIGURE 2 showing the cartridge in its extreme uppermost position relative to the tone arm.

FIGURE 2 shows the cartridge assembly 45 substantially in its lowermost position relative to the tone arm, and FIGURE 3 shows the cartridge assembly in its extreme uppermost position relative to the tone arm. In actual operation, the cartridge assembly will not normally assume either of these positions. Assuming that the tone arm is balanced to provide a three gram needle pressure, the adjusting screw 64 will be rotated so as to act on the spring bracket portion 34 which overlies the washer 70 and position the cartridge in such a way that when subjected to an upward force of three grams the cartridge will assume a desired intermediate position. During reproduction of a record, the cartridge 46 will then move vertically through a range of travel, the upper and lower limits of which will be approximately equidistant above and below the predetermined intermediate position and normally well within the extreme limiting poistions shown in FIGURES 2 and 3.

The adjustable means disclosed hereinabove has been found to be exceedingly simple to operate, and it provides a relatively inexpensive expedient for controlling the position or range of vertical travel of the cartridge 46. It will be understood that if desired the screw 64 may be replaced by a stud (not shown) which projects downwardly from the boss 66 and has a threaded lower end, whereby a nut may be threaded on the end of the stud to act upon the spring bracket portion 34. The latter procedure will eliminate the necessity of providing a tapped hole in the boss 66.

While a certain preferred form of my invention has been described and illustrated, it will be appreciated that modifications and changes may be made therein by those skilled in the art, particularly with my disclosure before them, and thus I do not intend to be limited to the particular disclosure, except insofar as the appended claims are so limited.

I claim:

1. A phonograph tone arm embodying a cartridge mounted in a vertically compliant manner, comprising, in combination, a tone arm housing, a cartridge spring bracket mounted in cantilever fashion comprising a rear horizontal portion fixedly secured to said tone arm housing, an offset portion which extends substantially upwardly from the forward end of said rear horizontal portion, and a forward generally horizontal portion extending forwardly from the upper end of said offset portion, a cartridge assembly mounted on said forward portion for vertical movement relative to said tone arm housing upon bending of said spring bracket, and a vertical adjusting screw extending upwardly through said rear horizontal portion forwardly of the fixed end thereof and into threaded engagement with a boss on said tone arm housing, said screw having a head portion which underlies said spring bracket whereby upon rotation of said screw said head will act upon said spring bracket and control the vertical position of said cartridge assembly.

2. A phonograph tone arm embodying a cartridge mounted in a vertically compliant manner, comprising, in combination, a tone arm housing, a cartridge spring bracket mounted in cantilever fashion having a fixed rear portion which is secured to said tone arm housing and a forward generally horizontal free portion, a cartridge assembly mounted on said forward portion for vertical movement relative to said tone arm housing upon bending of said spring bracket, and threaded adjustable means associated with the tone arm housing and movable to a selected vertical position upon rotation thereof, said adjustable means being mounted in engagement with a portion of said spring bracket forwardly of the fixed end thereof for adjustably controlling the vertical position of said cartridge assembly.

3. The invention of claim 2 wherein said adjustable means engages the underside of said spring bracket forwardly of and closely adjacent the fixed end thereof and said cartridge spring bracket is formed so as to be biased downwardly against said adjustable means when assembled in said tone arm housing.

4. A phonograph tone arm embodying a cartridge mounted in a vertically compliant manner, comprising, in combination, a tone arm housing, a cartridge spring bracket mounted in cantilever fashion having a fixed rear portion which is secured to said tone arm housing and a forward generally horizontal free portion, a cartridge assembly mounted on said forward portion for vertical movement relative to said tone arm housing upon bending of said spring bracket, a boss formed on said tone arm housing, and a vertical adjusting screw threaded into said boss and having a head portion underlying a portion of said spring bracket proximate the fixed end thereof whereby the vertical position of said spring bracket and said cartridge assembly may be adjusted by threading said screw in the desired vertical direction.

References Cited in the file of this patent

UNITED STATES PATENTS

| | | |
|---|---|---|
| 2,294,576 | Schneider | Sept. 1, 1942 |
| 2,369,087 | Hompson | Feb. 6, 1945 |
| 2,569,305 | Gordon | Sept. 25, 1951 |